United States Patent
Heo et al.

(10) Patent No.: US 12,152,789 B2
(45) Date of Patent: Nov. 26, 2024

(54) HOT WATER RETURNING SYSTEM

(71) Applicant: KYUNGDONG NAVIEN CO., LTD., Gyeonggi-do (KR)

(72) Inventors: Chang Heoi Heo, Seoul (KR); Yong Min Song, Seoul (KR)

(73) Assignee: Kyungdong Navien Co., Ltd., Gyeonggi-do (KR)

( * ) Notice: Subject to any disclaimer, the term of this patent is extended or adjusted under 35 U.S.C. 154(b) by 127 days.

(21) Appl. No.: 17/362,004

(22) Filed: Jun. 29, 2021

(65) Prior Publication Data
US 2022/0065465 A1 Mar. 3, 2022

(30) Foreign Application Priority Data

Aug. 25, 2020 (KR) .......................... 10-2020-0106763

(51) Int. Cl.
*F24D 19/10* (2006.01)
*F24D 17/00* (2022.01)

(52) U.S. Cl.
CPC ..... *F24D 19/1051* (2013.01); *F24D 17/0057* (2013.01); *F24D 17/0078* (2013.01); *F24D 2220/0207* (2013.01); *F24D 2220/042* (2013.01); *F24D 2220/044* (2013.01)

(58) Field of Classification Search
USPC ............................... 237/8 A, 8 R, 56, 59, 63
See application file for complete search history.

(56) References Cited

U.S. PATENT DOCUMENTS

| 4,936,289 | A | | 6/1990 | Peterson | |
| 5,626,287 | A | * | 5/1997 | Krause | G05D 23/1917 122/13.3 |
| 8,851,021 | B2 | | 10/2014 | Kim | |
| 2012/0216998 | A1 | * | 8/2012 | Kim | F24D 17/0078 165/200 |
| 2018/0073749 | A1 | * | 3/2018 | Gagne | F24H 15/215 |
| 2020/0309387 | A1 | * | 10/2020 | Hasegawa | F24H 1/101 |

FOREIGN PATENT DOCUMENTS

| CN | 101315207 A | 12/2008 |
| CN | 106766230 A | 5/2017 |
| CN | 110425754 A | 11/2019 |
| JP | 2013-504034 A | 2/2013 |
| KR | 10-2014-0108916 A | 9/2014 |
| KR | 10-2020-0081752 A | 7/2020 |

* cited by examiner

*Primary Examiner* — Steven B McAllister
*Assistant Examiner* — John E Bargero

(57) ABSTRACT

A hot water returning system according to the present disclosure includes a hot water generator that generates hot water, a hot water line that supplies the hot water to a source of demand, a water returning line that returns the hot water to the hot water generator for preheating the hot water in the hot water line, a pump which pumps the hot water for returning of the hot water, and a processor electrically connected to the pump, and the processor is configured to determine a need for preheating corresponding to whether it is necessary to preheat the hot water and a status for use of hot water corresponding to whether the hot water is supplied to a source of demand, and control the pump based on the need for preheating and the status for use of hot water.

11 Claims, 3 Drawing Sheets

HOT WATER RETURNING SYSTEM

CROSS-REFERENCE TO RELATED APPLICATION

This application claims the benefit of priority to Korean Patent Application No. 10-2020-0106763, filed in the Korean Intellectual Property Office on Aug. 25, 2020, the entire contents of which are incorporated herein by reference.

TECHNICAL FIELD

The present disclosure relates to a hot water returning system that returns, preheats, and provides hot water.

BACKGROUND

A water heater, such as a hot water supply device or a boiler, is a device that heats and provides water such that the water may be used for heating or discharges the water in a form of hot water. As a heat source of the hot water supply device, a burner that performs a combustion reaction by using fuels and oxygen to generate a large amount of heat and provides the heat to water through a heat exchanger.

When the hot water is provided to sources of demand in a method of being discharged to the outside, the hot water has to stand by, by a period of time, for which the hot water reaches the source of demand from a water heater to be discharged at a preset temperature, and for the period of time, direct water that has not been sufficiently heated is discharged or discarded so that it cannot be properly used by a user.

Accordingly, in order to supply hot water at a specific temperature or more, a hot water returning system that returns hot water may be provided. In a state in which hot water is not discharged, the water corresponding to the hot water may be continuously preheated while circulating.

When the user uses hot water or cold water, it is not preferable to supply hot water of an excessively high temperature through a faucet, and thus when the hot water is a temperature that is any limit temperature or more, it is necessary to stop preheating of a heat source after the hot water recirculates. Accordingly, it is necessary to preheat the hot water or stop preheating after determining a need for preheating in a hot water returning system, and generally temperature may be the reference.

However, when a need for preheating is determined with reference to temperature, a temperature of the hot water provided to the user when the pump for preheating is operated and a temperature of the hot water provided to the user when the pump is not operated in a situation in which the hot water is used may be different. In particular, when the operational state of the pump is changed while the hot water is used, the temperature of the hot water may be abruptly changed, and the user may feel uncomfortable.

SUMMARY

The present disclosure has been made to solve the above-mentioned problems occurring in the prior art while advantages achieved by the prior art are maintained intact.

An aspect of the present disclosure provides a hot water returning system that may reduce a deviation of the temperature of hot water when the hot water is used.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, there is provided a hot water returning system including a hot water generator that generate hot water, a hot water line that supplies the hot water generated by the hot water generator to a source of demand, a water returning line that returns the hot water to the hot water generator for preheating the hot water in the hot water line, a pump disposed in any one of an inner line in the hot water generator, the hot water line, and the water returning line and which pumps the hot water for returning of the hot water, and a processor electrically connected to the pump, wherein the processor is configured to determine a need for preheating corresponding to whether it is necessary to preheat the hot water and a status for use of hot water corresponding to whether the hot water is supplied to a source of demand, and control the pump based on the need for preheating and the status for use of hot water.

According to another aspect of the present disclosure, there is provided a hot water returning system including a hot water generator that generates hot water, a hot water line that supplies the hot water generated by the hot water generator to a source of demand, a water returning line that returns the hot water to the hot water generator for preheating the hot water in the hot water line, a pump disposed in any one of an inner line in the hot water generator, the hot water line, and the water returning line and which pumps the hot water for returning of the hot water, a temperature acquirer that acquires a temperature of water, including at least one of direct water and the hot water returned by the water returning line, which is provided to the hot water generator, and a processor electrically connected to the pump, wherein the processor is configured to control the pump to stop when the temperature acquired by the temperature acquirer is more than a preheating stop reference temperature.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
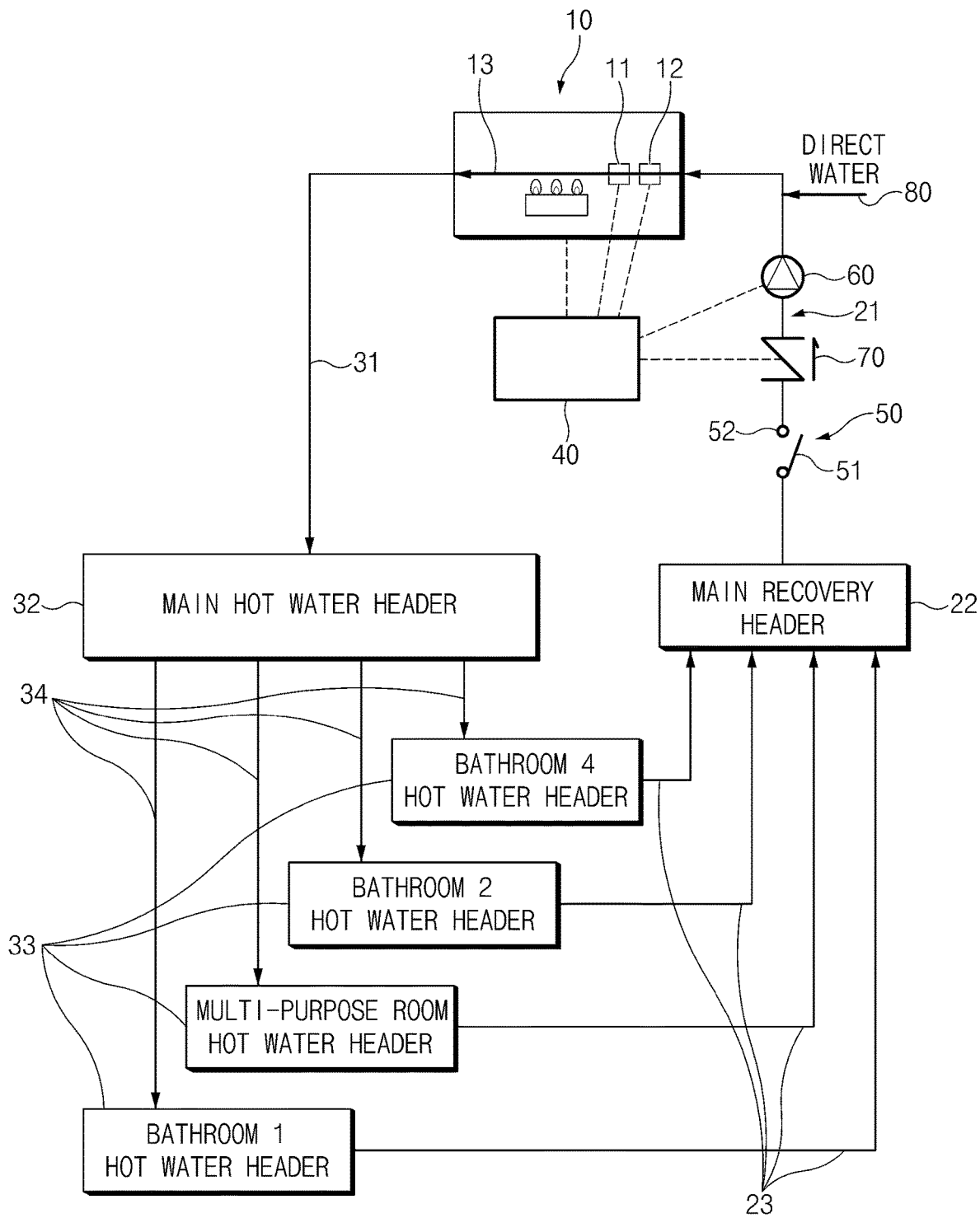
FIG. 1 is a conceptual view of a hot water returning system according to an embodiment of the present disclosure.

Hereinafter, some embodiments of the present disclosure will be described in detail with reference to the exemplary drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the components from other components, and the essences, sequences, orders, and numbers of the components are not limited by the terms. When it is described that one element is connected, coupled, or jointed to another element, the element may be directly connected or coupled to the other element, but a third element may be connected, coupled, or jointed between the elements.

FIG. 1 is a conceptual view of a hot water returning system 1 according to an embodiment of the present disclosure.

According to an embodiment of the present disclosure, the hot water returning system 1 includes a hot water generator 10, hot water lines 31 and 34, water returning lines 21 and 23, a pump 60, and a processor 40. The hot water returning system 1 may further include an aquastat 50. The hot water returning system 1 may further include a temperature acquirer 12. The hot water returning system 1 may further include a flow rate acquirer 11.

Hot Water Generator 10

The hot water generator 10 is a component for generating hot water. The hot water generator 10 is a component that forms hot water by heating introduced direct water or the hot water returned through the water returning lines 21 and 23. Accordingly, the hot water generator 10 may include a burner that burns fuels together with air, and a heat exchanger that heats water by using sensible heat generated through the burning of the fuels and latent heat of combustion gas that is a result of the burning. However, any device not using a fuel, which may receive and heat water to form hot water and send out the hot water may be used as the hot water generator 10.

The hot water generator 10 may include an inner line 13. The inner line 13 is a passage, through which water flows in the hot water generator 10. The water returning lines 21 and 23 and a direct water line 80, which will be described below, may merge into one and may be connected to the inner line 13, or may be connected to the inner line 13 separately. The water may be heated while flowing through the inner line 13, and the heated water may be discharged to the hot water lines 31 and 34. Hereinafter, components referred to as lines are passages, through which water flows, and may be implemented by pipelines or hoses.

Hot Water Lines 31 and 34

The hot water lines 31 and 34 are lines for supplying the hot water generated by the hot water generator 10 to a source of demand. The main hot water line 31 of the hot water lines 31 and 34 communicates the hot water generator 10 and a main hot water header 32. Accordingly, the hot water generated by the hot water generator 10 may be supplied to the main hot water header 32 through the main hot water line 31. The main hot water header 32 may supply the hot water to individual hot water headers 33 located in the respective sources of demand through the individual hot water lines 34 of the hot water lines 31 and 34. The individual hot water headers 33 may discharge the hot water to the sources of demand or return the hot water to the water returning lines 21 and 23, which will be described below. The individual hot water headers 33 may be disposed in various sources of demand, such as a bathroom, a multi-purpose room, and the like as illustrated in the drawings.

Water Returning Lines 21 and 23

The water returning lines 21 and 23 are lines provided to return the hot water in the hot water lines 31 and 34 for preheating the hot water. The individual returning lines 23 of the water returning lines 21 and 23 communicate the individual hot water headers 33 and the main returning header 22. Accordingly, the hot water may be returned from the individual hot water headers 33 to the main returning header 22. The main returning header 22 is communicated with the hot water generator 10 through the main water returning line 21 of the water returning lines 21 and 23. Accordingly, the returned hot water that gathered in the main returning header 22 may be provided to the hot water generator 10 through the main water returning line 21.

The direct water line 80 may be communicated with the main water returning line 21. Accordingly, the returned hot water and the direct water may be mixed and may be provided to the hot water generator 10. However, as described above, the main water returning line 21 and the direct water line 80 may be communicated with the inner line 13 separately.

Water returning valves 70 may be further disposed in the water returning lines 21 and 23. A water returning valve 70 may be disposed in the main water returning line 21. An opening/closing operation of the water returning valve 70 may be adjusted such that the water is returned or interrupted. The water returning valves 70 may be electrically connected to the processor 40, and may be controlled by the processor 40. The water returning valves 70 may be check valves. However, mechanical check valves that are not controlled by the processor 40 may be used as the water returning valves 70.

Pump 60

The pump 60 is a component that is provided to pump the hot water for returning the hot water. As the pump 60 is operated, the water may circulate along the inner line 13, the hot water lines 31 and 34, and the water returning lines 21 and 23. Accordingly, the pump 60 may be disposed in any one of the inner line 13 in the hot water generator 10, the hot water lines 31 and 34, and the water returning lines 21 and 23. Although it has been described in the embodiment of the present disclosure that the pump 60 is disposed in the main water returning line 21, the location of the pump 60 is not limited thereto.

The pump 60 may be electrically connected to the processor 40, and an operation of the pump 60 may be performed (an ON state) or stopped (an OFF state) under the control of the processor 40.

Aquastats 50

The aquastats 50 are components that are electrically connected to the processor 40 and transmit electrical signals to the processor 40. The aquastats 50 are disposed in the water returning lines 21 and 23. Accordingly, the aquastats 50 are variably operated according to the temperature of the returned hot water to transmit different electrical signals to the processor 40.

Each of the aquastats 50 may include a detachable member and an electrical contact point. The detachable member may be attached to or detached from the electrical contact point according to the temperatures of the hot water in the water returning lines 21 and 23. When the temperature of the hot water in the water returning lines 21 and 23 is a specific reference temperature or less, the detachable member may contact the electrical contact point and may transmit an electrical signal to the processor 40. When the temperature of the hot water in the water returning lines 21 and 23 is more than the specific reference temperature, the detachable member may be separated from the electrical contact point and may not transmit an electrical signals to the processor 40. Although the detachable member includes a bimetal to physically change due to the temperatures of the hot water, any device other than a bimetal that may be attached to and detached from the electrical contact point according to temperature may be used as the detachable member.

The processor 40 may determine that there is a need for preheating in determining a need for preheating when the detachable member contacts the electrical contact point, and may determine that there is no need for preheating in determining a need for preheating when the detachable member is separated from the electrical contact point. A detailed description thereof will be made in a description of the processor 40.

Temperature Acquirer 12

The temperature acquirer 12 is a component that is disposed in the inner line 13 and acquires the temperature of the water provided to the hot water generator 10 for heating. Accordingly, the temperature acquirer 12 may be disposed in the interior of the hot water generator 10. The water provided to the hot water generator 10 may include at least one of the direct water provided by the direct water line 80 and the hot water returned by the water returning lines 21 and 23.

The temperature acquirer 12 may be a thermostat, a thermo couple, and the like, but any device that may acquire the temperature of water may be sufficient and the kinds thereof are not limited. The temperature acquirer 12 may be electrically connected to the processor 40, and may deliver the acquired temperature to the processor 40 in a form of an electrical signal.

Flow Rate Acquirer 11

The flow rate acquirer 11 is a component that acquires the flow rate of water provided to the hot water generator 10. The flow rate acquirer 11 may be disposed in the inner line 13 and may be located in the interior of the hot water generator 10.

The flow rate acquirer 11 may be an orifice flow meter, an ultrasonic flow meter, a vortex flow meter, and the like, but the kind of the flow rate acquirer 11 is not limited as long as it is a device that may acquire the flow rate of the water. The flow rate acquirer 11 may be electrically connected to the processor 40, and may deliver the acquired flow rate to the processor 40 in a form of an electrical signal.

Processor 40

The processor 40 is a component that controls the other components included in the hot water returning system 1. The processor 40 may include a microprocessor 40 such as a field programmable gate array (FPGA), an application specific integrated circuit (ASIC), or a central processing unit (CPU), but the kind of the calculation device is not limited thereto.

Furthermore, the hot water returning system 1 may further include a memory that stores a plurality of control instructions that are bases for generating instructions for controlling the components by the processor 40. The processor 40 may be programmed to receive control instructions from the memory and generate electrical signals for controlling the components based on the control instructions. The memory may be data storage such as a hard disk drive (HDD), a solid state drive (SSD), a volatile medium, or a nonvolatile medium, but the kind of the memory is not limited thereto.

The processor 40, as illustrated, may be disposed outside the hot water generator 10, separately from the hot water generator 10, but may be disposed in the interior of the hot water generator 10 and may be a component of the hot water generator 10.

The processor 40, as described above, may be electrically connected to the pump 60. The processor 40 may deliver an electrical signal for supply or control of electric power to the pump 60 to operate or stop the pump 60. The processor 40 may be further electrically connected to the temperature acquirer 12 and the flow rate acquirer 11. The processor 40 may receive the temperature value acquired by the temperature acquirer 12 in a form of an electrical signal, may receive the flow rate acquired by the flow rate acquirer 11 in a form of an electrical signal, and may control the pump 60 based on at least one of the temperature and the flow rate. The processor 40 may be further electrically connected to the hot water generator 10 to control an operation of the hot water generator 10.

The processor 40 determines a need for preheating corresponding to whether it is necessary to preheat the hot water and a status for use of hot water corresponding to whether the hot water is supplied to the source of demand. The processor 40 controls the pump based on the need for preheating and the status for use of hot water.

When determining that there is a need to supply hot water in determining a status for use of hot water when the need for preheating is changed, the processor 40 may control the pump 60 to maintain the existing operational state. Accordingly, even though a situation that requires or does not require preheating and the pump 60 is requested to restart an operation or stop the operation, the processor 40 may maintain the existing operational state of the pump 60 in a situation in which the hot water is used and continuously supplied. Because the existing operational state of the pump 60 is maintained during use of the hot water, the user may not experience an abrupt change in the temperature of the hot water.

In contrast, when determining that there is no supply of the hot water in determining a status for use of hot water when the need for preheating is changed, the processor 40 may control the pump 60 to change the operational state. That is, when a situation that does not require preheating is changed to a situation that requires preheating but the hot water is not used, it does not matter even though preheating is started, and thus the processor 40 may start preheating by operating the pump 60. Furthermore when a situation that requires preheating is changed to a situation that does not require preheating and the hot water is not used, there is no need for preheating, and thus the processor 40 may stop the operation of the pump 60.

In detail, when determining that there is a need for preheating after determining that there is no need for preheating in determining a need for preheating when determining that there is no supply of the hot water in determining a status for use of hot water, the processor 40 may control the pump 60 to start the operation thereof. Furthermore, when determining that there is no need for preheating after determining that there is a need for preheating in determining a need to preheat the hot water when determining that there is no supply of the hot water in determining a status for use of hot water, the processor 40 may control the pump 60 to stop the operation thereof.

In a situation in which preheating is not started even through there is a need for preheating because the hot water is being used, the processor 40 may control the pump 60 to perform a delayed operation of starting preheating after the use of the hot water is stopped. In detail, when no need for preheating is changed to a need for preheating in determining a need for preheating and it is determined that there is a supply of the hot water in determining a status for use of hot water, the pump 60 may be controlled to start the operation thereof when the supply of the hot water is changed to no supply of the hot water in determining a status for use of hot water while being controlled to maintain the existing operational state of the pump 60. When the use of the hot water is stopped due to the delayed operation, preheating may be immediately made.

Furthermore, the processor 40 may determine that there is a need for preheating again when the use of the hot water is stopped. In detail, when no need for preheating is changed to a need for preheating in determining a need for preheating and it is determined that there is a supply of the hot water in determining a status for use of hot water, the pump 60 may be controlled based on determination of a need for preheating corresponding to the time at which the status for use of hot water is changed when the supply of the hot water is changed to no supply of the hot water in determining a status for use of hot water while being controlled to maintain the existing operational state of the pump 60. In a situation in which preheating is still necessary even though the use of the hot water is stopped, as described above, preheating may be made immediately by operating the pump 60. However, in a situation in which there is no need for preheating after the use of the hot water is stopped, there is no reason for the operation of the pump 60 and a separate control is not made.

In the hot water returning system 1 according to the embodiment of the present disclosure, the processor 40 may determine a need for preheating by using the aquastats 50. In detail, when the detachable members contact the electrical contact points, the processor 40 electrically connected to the aquastats 50 may determine that there is a need for preheating in determining a need for preheating. In contrast, when the detachable members are spaced apart from the electrical contact points, the processor 40 may determine that there is no need for preheating in determining a need for preheating.

When determining that there is the need for preheating in determining a need for preheating, the processor 40 may determine a status for use of hot water based on the flow rate acquired by the flow rate acquirer 11. The flow rate of the hot water flowing along the inner line 13 will be a specific reference flow rate or more when the hot water is used, and the flow rate of the hot water flowing along the inner line 13 will be less than the specific reference flow rate when the hot water is not used. Accordingly, the processor 40 may determine that there is a supply of the hot water in determining a status for use of hot water when the flow rate acquired by the flow rate acquirer 11 is the specific reference flow rate or more, and may determine that there is no supply of the hot water in determining a status for use of hot water when the acquired flow rate is less than the reference flow rate.

When determining that there is no need for preheating in determining a need for preheating, the processor 40 may estimate a status for use of hot water based on the temperature acquired by the temperature acquirer 12. In the state in which the hot water is used, the returning hot water will be continuously mixed with direct water, and hence, the acquired temperature will not exceed a specific preheating stop reference temperature. Accordingly, when at least the acquired temperature exceeds the preheating stop reference temperature, it may be estimated that the hot water is not used. Accordingly, when the acquired temperature is the preheating stop reference temperature or more, the processor 40 may estimate that there is no supply of the hot water in determining a status for use of hot water. The preheating stop reference temperature may be a specific temperature that is higher than the temperature of the hot water which is to be provided to the source of demand.

The preheating stop reference temperature may be arbitrarily input and changed by the user. For input of a temperature, the hot water returning system 1 may further include an input device electrically connected to the processor 40.

Figure 2:
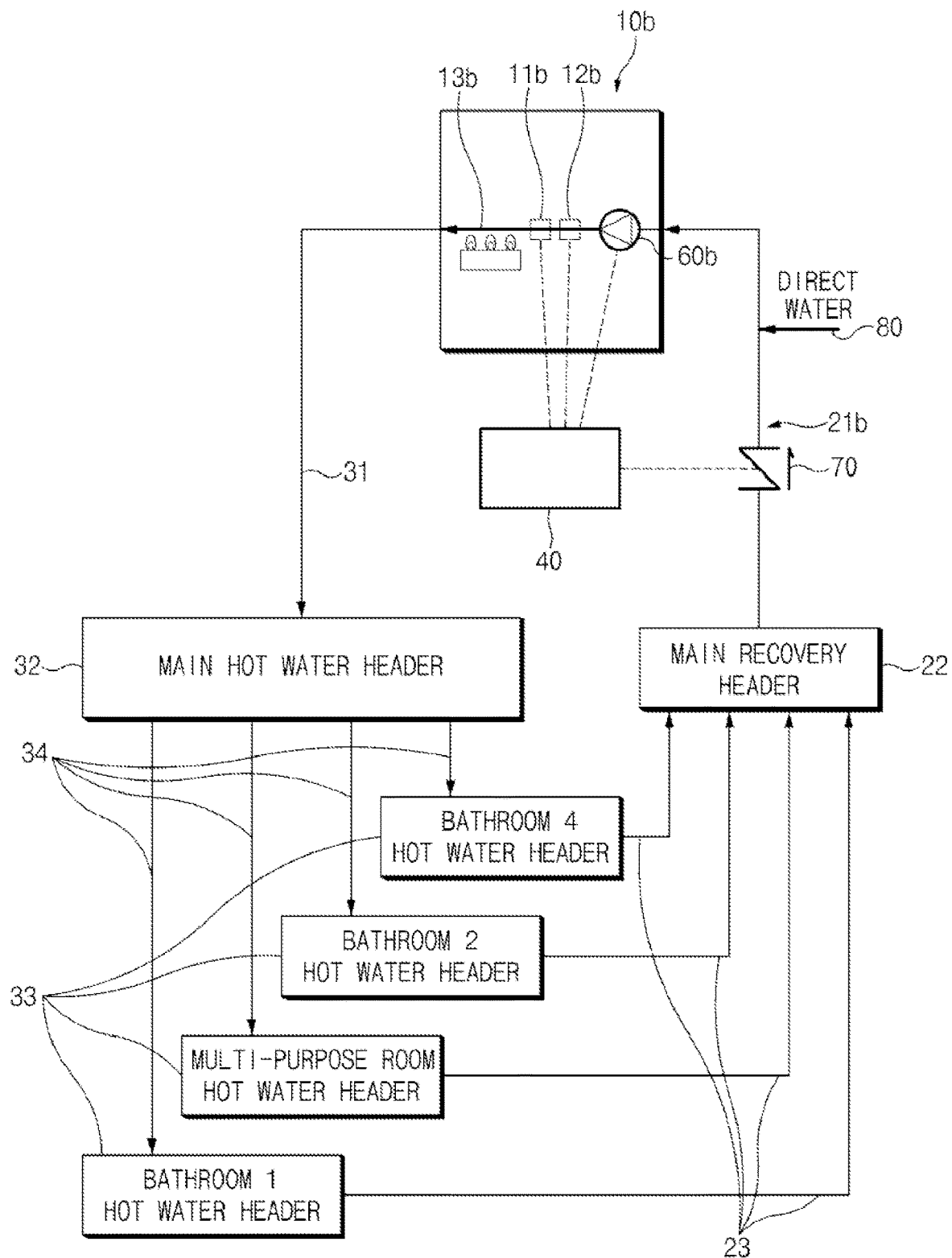
FIG. 2 is a view of a hot water returning system according to another embodiment of the present disclosure.

FIG. 2 is a view of a hot water returning system 2 according to another embodiment of the present disclosure.

The hot water returning system 2 according to the embodiment of the present disclosure of FIG. 2 are mainly different from the hot water returning system according to the embodiment of FIG. 1 in that the aquastat 50 is not used. The components of the hot water returning system 2 according to the embodiment of FIG. 2 are the same as or similar to the components of the hot water returning system 1 according to the embodiment of FIG. 1, and thus only different aspects will be further described.

A pump 60b of the hot water returning system 2 according to the embodiment of the present disclosure is not disposed not in a main water returning line 21b but in an inner line 13b. Accordingly, the pump 60b may be disposed in the interior of a hot water generator 10b.

The processor 40 of the hot water returning system 2 according to the embodiment of the present disclosure may determine a need for preheating based on a temperature acquired by a temperature acquirer 12b. In detail, the processor 40 may determine that there is a need for preheating in determining a need for preheating when the temperature acquired by the temperature acquirer 12b is lower than a specific preheating operation reference temperature. Furthermore, the processor 40 may determine that there is no need for preheating in determining a need for preheating when the temperature acquired by the temperature acquirer 12b is higher than the specific preheating stop reference temperature. The preheating operation reference temperature is a specific temperature that is lower than the preheating stop reference temperature. Because the water is not heated to a degree that is high enough to be provided to the user when the temperature of the water is lower than the preheating operation reference temperature, it may be determined that there is a need for preheating. Furthermore, because the water is sufficiently heated when the temperature of the water is higher than the preheating stop reference temperature, it may be determined that there is no need for preheating.

When determining that there is a need for preheating as the acquired temperature is lower than the preheating operation reference temperature, the processor 40 may determine a status for use of hot water based on the flow rate acquired by a flow rate acquirer 11b and control the pump 60b based on the determination. A method for controlling the pump 60b based on the flow rate acquired by the flow rate acquirer 11b when it is determined that there is a need for preheating in determining a need for preheating is the same as that of the hot water returning system 1 according to the embodiment of FIG. 1, and thus a description thereof will be omitted.

When the acquired temperature is more than the preheating stop reference temperature, it may be determined that there is no need for preheating in determining a need for preheating and it may be estimated that there is no supply of the hot water in determining a status for use of hot water as well. That is, the acquired temperature is more than the preheating stop reference temperature, the processor 40 does not separately determine or estimate a need for preheating and a status for use of hot water and directly determine that it is a situation in which there is a need for preheating and the hot water is not used, and may perform a control to stop the operation of the pump 60b.

The preheating operation reference temperature and the preheating stop reference temperature may be arbitrarily input and changed by the user. For input of a temperature, the hot water returning system 2 may further include an input device electrically connected to the processor 40. In the embodiment of the present disclosure, a target temperature of the hot water discharged from the hot water generator 10 may be 49 degrees Celsius, the preheating stop reference temperature may be set to 44 degrees Celsius that is lower than the target temperature by 5 degrees Celsius, and the preheating operation reference temperature is not input, but the determination of the temperatures is not limited thereto.

Figure 3:
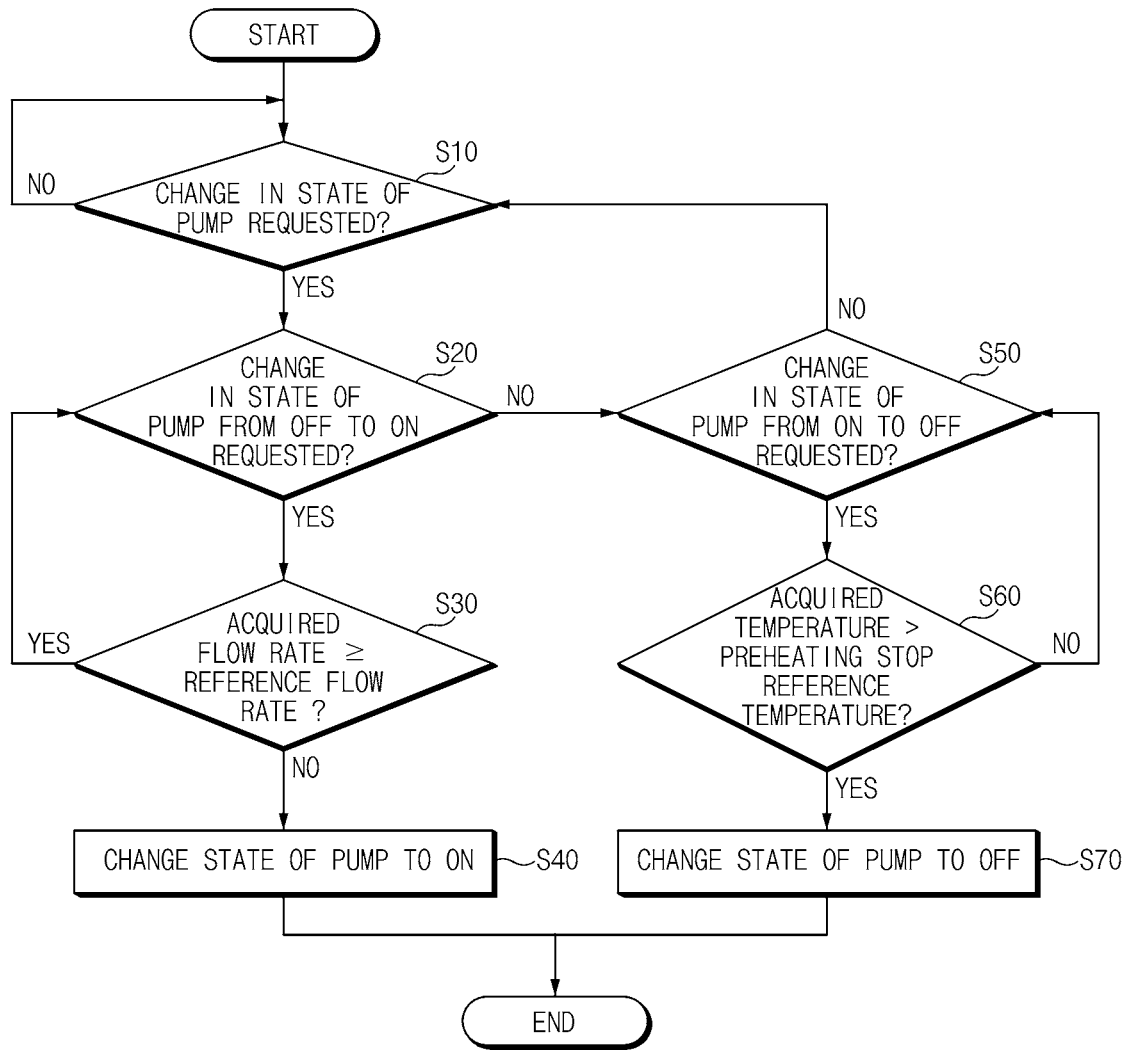
FIG. 3 is a flowchart illustrating a method for controlling a hot water returning system of the present disclosure.

FIG. 3 is a flowchart illustrating a method for controlling the hot water returning systems 1 and 2 of the present disclosure.

Referring to the drawings, the hot water returning systems 1 and 2 of the present disclosure may be controlled according to a following process. While the temperature of the hot water returned through the water returning lines 21, 21b, and 23 is changed, a request for a change of the operational states of the pumps 60 and 60b may be made to the processor 40. The processor 40 determines whether the operations 60 and 60b, to which the request for the change of the operational states of the pumps 60 and 60b has been stopped, are requested to be started (S20), and otherwise, determines whether the operations of the pumps 60 and 60b, which are being operated, are requested to be stopped (S50). That is, the processor 40 determines whether no need for preheating is changed to a need for preheating in determining a need for preheating (S20), and determines whether a need for preheating is changed to no need for preheating in determining a need for preheating (S50).

When the pumps 60 and 60b are requested to start the operations thereof, the processor 40 determines whether the flow rate acquired by the flow rate acquirer 11 is a reference flow rate or more (S30). That is, the status for use of hot water is determined by using the flow rates. Because the hot water is being used when the acquired flow rate is the reference flow rate or more, the operation (S20) of determining whether the pump 60 is requested to start the operation thereof is performed again and a separate control is not made on the pump 60 whereby the existing operational state may be maintained by the pump 60. However, because the hot is not being used when the acquired flow rate is less than the reference flow rate, the processor 40 performs a control to start the operation of the pump 60 for preheating (S40).

When the pump 60 is requested to stop the operation thereof, the processor 40 determines whether the temperatures acquired by the temperature acquirers 12 and 12b are more than the preheating stop reference temperature (S60). That is, the status for use of hot water is determined by using the temperatures. Because the hot water may be used when the acquired temperatures are less than the preheating stop reference temperature, the operation (S50) of determining whether the pumps 60 and 60b are requested to stop the operations thereof may be performed again and separate controls are not be made on the pumps 60 and 60b whereby the pumps 60 and 60b maintain the existing operational states. However, because the hot water is not being used when the acquired temperatures are more than the preheating stop reference temperature, the processor 40 performs to stop the operations of the pumps 60 and 60b for stop of preheating (S70).

Although it may have been described until now that all the elements constituting the embodiments of the present disclosure are coupled to one or coupled to be operated, the present disclosure is not essentially limited to the embodiments. That is, without departing from the purpose of the present disclosure, all the elements may be selectively coupled into one or more elements to be operated. Furthermore, because the terms, such as "comprising", "including", or "having" may mean that the corresponding element may be included unless there is a specially contradictory description, it should be construed that another element is not extruded but may be further included. In addition, unless defined otherwise, all terms used herein, including technical or scientific terms, have the same meanings as those generally understood by those skilled in the art to which the present disclosure pertains. The terms, such as the terms defined in dictionaries, which are generally used, should be construed to coincide with the context meanings of the related technologies, and are not construed as ideal or excessively formal meanings unless explicitly defined in the present disclosure.

Accordingly, the operational state of the pump for preheating may be maintained while the hot water is used, whereby the deviation of the temperature of the hot water provided to the user may be reduced and an abrupt change of the temperature of the hot water may be prevented.

The above description is a simple exemplification of the technical spirits of the present disclosure, and the present disclosure may be variously corrected and modified by those skilled in the art to which the present disclosure pertains without departing from the essential features of the present disclosure. Accordingly, the embodiments disclosed in the present disclosure is not provided to limit the technical spirits of the present disclosure but provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure.

What is claimed is:

1. A hot water returning system comprising:
a hot water generator configured to generate hot water;
a hot water line configured to supply the hot water generated by the hot water generator to a source of demand;
a water returning line configured to return water to the hot water generator for preheating the water in the hot water line;
a pump disposed in any one of an inner line in the hot water generator, the hot water line, and the water returning line and configured to pump the water for returning of the water; and
a processor electrically connected to the pump,
wherein the processor is configured to:
(i) determine a need for preheating and a status for use of hot water, wherein the status for use of hot water corresponds to whether hot water is being supplied to a source of demand; and
(ii) control the pump based on the determination of the need for preheating and the status for use of hot water, and
when the need for preheating is changed, control the pump to maintain an existing operational state when the status for use of hot water is determined to be that hot water is being supplied to the source of demand, and
when the need for preheating is changed, control the pump to change the operational state when the status for use of hot water is determined to be that hot water is not being supplied to the source of demand.

2. The hot water returning system of claim 1, wherein the processor is configured to:

when it is determined that there is no supply of the hot water in determining the status for use of hot water, control the pump to start an operation when it is determined that there is a need for preheating in determining the need for preheating while it is determined that there is no need for preheating; and control the pump to stop the operation when it is determined that there is no need for preheating in determining the need for preheating while it is determined that there is a need for preheating.

3. The hot water returning system of claim 1, wherein the processor is configured to:

control the pump to maintain an existing operational state when the determination of the need for preheating is changed from a determination that preheating is unnecessary to a determination that there is a need for preheating and the status for use of hot water is determined to be that hot water is being supplied, control the pump to start an operation to supply hot water when the determination of the status for use of hot water is changed to a determination that hot water is not being supplied, while controlling the pump to maintain the existing operational state.

4. The hot water returning system of claim 1, wherein the processor is configured to:

control the pump based on the need for preheating at the time when the status for use of hot water is changed, when the determination is changed to a determination that there is no supply of the hot water in determining the status for use of hot water while controlling the pump to maintain an existing operational state, when the determination that there is no need for preheating is changed to a determination that there is a need for preheating in determining the need for preheating and it is determined that there is a supply of the hot water in determining the status for use of hot water.

5. The hot water returning system of claim 1, further comprising:

an aquastat disposed in the water returning line, provided with a detachable member that is detachably mounted on an electrical contact point according to a temperature of the water in the water returning line, and electrically connected to the processor, wherein the processor is configured to:

determine that there is a need for preheating in determining the need for preheating when the detachable member contacts the electrical contact point, and determine that there is no need for preheating in determining the need for preheating when the detachable member is spaced apart from the electrical contact point.

6. The hot water returning system of claim 1, further comprising:

a temperature acquirer configured to acquire a temperature of water provided to the hot water generator, and wherein the processor is configured to:

determine that there is a need for preheating in determining the need for preheating when the temperature acquired by the temperature acquirer is lower than a specific preheating operation reference temperature, and determine that there is no need for preheating in determining the need for preheating when the temperature acquired by the temperature acquirer is higher than a specific preheating stop operation reference temperature.

7. The hot water returning system of claim 1, further comprising:

a flow rate acquirer configured to acquire a flow rate of water provided to the hot water generator, and wherein the processor is configured to:

determine the status for use of hot water based on the flow rate acquired by the flow rate acquirer.

8. The hot water returning system of claim 7, wherein the processor is configured to:

determine that there is a supply of the hot water in determining the status for use of hot water when the flow rate acquired by the flow rate acquirer is a specific reference flow rate or more, and determine that there is no supply of the hot water in determining the status for use of hot water when the acquired flow rate is less than the reference flow rate.

9. The hot water returning system of claim 1, further comprising:

a temperature acquirer configured to acquire a temperature of water provided to the hot water generator, and wherein the processor is configured to:

determine the status for use of hot water based on the temperature acquired by the temperature acquirer.

10. The hot water returning system of claim 9, wherein the processor is configured to:

estimate that there is no supply of the hot water in determining the status for use of hot water when the acquired temperature is more than a preheating stop reference temperature.

11. The hot water returning system of claim 1, wherein water provided to the hot water generator includes at least one of direct water and the hot water returned by the water returning line.

* * * * *